US007433346B2

(12) United States Patent
Nah

(10) Patent No.: US 7,433,346 B2
(45) Date of Patent: Oct. 7, 2008

(54) CARD DEVICE FOR HIGH-SPEED WIRELESS DATA COMMUNICATION

(75) Inventor: Kyeong-Moon Nah, Seoul (KR)

(73) Assignee: Flextronics International Ltd. (MU)

( * ) Notice: Subject to any disclaimer, the term of this patent is extended or adjusted under 35 U.S.C. 154(b) by 807 days.

(21) Appl. No.: 10/284,952

(22) Filed: Oct. 31, 2002

(65) Prior Publication Data

US 2003/0081666 A1 May 1, 2003

(30) Foreign Application Priority Data

Oct. 31, 2001 (KR) .............................. 2001-67711

(51) Int. Cl.
*H04B 1/30* (2006.01)
(52) U.S. Cl. ............... 370/342; 455/554.2; 455/557
(58) Field of Classification Search .............. 370/342; 455/554.2, 557
See application file for complete search history.

(56) References Cited

U.S. PATENT DOCUMENTS

| 5,774,461 | A | * | 6/1998 | Hyden et al. ............ 370/310.2 |
| 5,889,816 | A | * | 3/1999 | Agrawal et al. ............ 375/220 |
| 5,896,386 | A | * | 4/1999 | Johnston ............ 370/466 |
| 6,064,649 | A | * | 5/2000 | Johnston ............ 370/310.2 |
| 6,823,441 | B1 | * | 11/2004 | Ward et al. ............ 711/211 |
| 6,915,142 | B1 | * | 7/2005 | Wietfeldt ............ 455/557 |
| 7,024,223 | B1 | * | 4/2006 | Wietfeldt ............ 455/557 |

* cited by examiner

*Primary Examiner*—Edan Orgad
(74) *Attorney, Agent, or Firm*—Cantor Colburn LLP

(57) ABSTRACT

A card device for performing high-speed wireless data communication faster and more stable than a wireless data communication via an existing USB interface and UART serial bus interface is provided, including an antenna for transmitting and receiving a RF signal, a RF signal converter for converting the RF signal received by the antenna into a baseband signal and converting an internal data signal into an RF signal, and a mobile communication modem for outputting the internal data signal to the RF signal converter, receiving the baseband signal from the RF signal converter, checking whether a dual port RAM is accessible, and performing a data transmission/receiving operation with the dual port RAM when the dual port RAM is accessible. The dual port RAM has two ports connected respectively to the mobile communication modem and a PCMCIA interface and interfaces a data transmission/receiving operation between the mobile communication modem and the PCMCIA interface. The PCMCIA interface is connected to a personal computer according to a PCMCIA protocol, checks whether the dual port RAM is accessible, and performs a data transmission/receiving operation with the dual port RAM when the dual port RAM is accessible.

8 Claims, 3 Drawing Sheets

CARD DEVICE FOR HIGH-SPEED WIRELESS DATA COMMUNICATION

BACKGROUND OF THE INVENTION

1. Field of the Invention

The present invention relates to a card device for high-speed wireless data communication.

2. Description of the Related Art

Wireless data communications signify that a person in movement connects a mobile communication terminal, such as a portable computer or personal digital assistant (PDA), to a cellular phone and transmits and receives various data wirelessly.

In order to overcome the inconvenience of separate connection to a cellular phone, card devices for wireless data communication containing mobile communication modems have been developed.

FIG. 2 is a block diagram schematically showing a mobile communication modem, for example, a MSM 5500 mobile communication modem manufactured by Qualcom™ Inc. (referred to hereinafter as an "MSM modem") which is embodied in a wireless data communication card device.

As shown in FIG. 2, the MSM modem includes a CDMA (Code Division Multiple Access) processor 31, a universal processor 32, a USB (Universal Serial Bus) interface 33, a UART (Universal Asynchronous Receiver/Transmitter) serial bus interface 34, and a universal interface bus 35.

The card device equipped with the MSM modem is mounted to a mobile communication terminal, such as a portable computer or PDA, to conduct wireless data communication via the USB interface 33 and UART serial bus interface 34.

A MSM modem including a high-speed CDMA processor with a maximum data rate of 2.45 Mbps satisfies the date rate of a USB interface, but the modem has a difficulty in connecting with a PCMCIA (Personal Computer Memory Card International Association) interface and limits the date rate of a UART serial bus interface. For this reason, such an MSM modem including the high-speed CDMA processor cannot be contained and used in a card device for wireless data communication.

SUMMARY OF THE INVENTION

Therefore, the present invention provides a card device wherein a mobile communication modem with a high-speed CDMA processor is connected in parallel with a dual port random access memory (RAM) to transmit and receive address and data signals to/from the dual port RAM via a universal interface bus, thereby enabling high-speed wireless data communication.

In accordance with the present invention, a card device for high-speed wireless data communication, comprises: an antenna for transmitting and receiving a radio frequency (RF) signal; a RF signal converter for converting the RF signal received by the antenna into a baseband signal and converting an internal data signal into a RF signal; a mobile communication modem for outputting the internal data signal to the RF signal converter, receiving the baseband signal from the RF signal converter, checking whether a dual port random access memory (RAM) is accessible, and performing a data transmission/receiving operation with the dual port RAM when the dual port RAM is accessible; the dual port RAM having two ports respectively connected to the mobile communication modem and a PCMCIA (Personal Computer Memory Card International Association) interface, the dual port RAM interfacing a data transmission/receiving operation between the mobile communication modem and the PCMCIA interface; and the PCMCIA interface being connected to a personal computer according to a PCMCIA protocol, the PCMCIA interface checking whether the dual port RAM is accessible, and performing a data transmission/receiving operation with the dual port RAM when the dual port RAM is accessible.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF PREFERRED EMBODIMENTS

Figure 1:
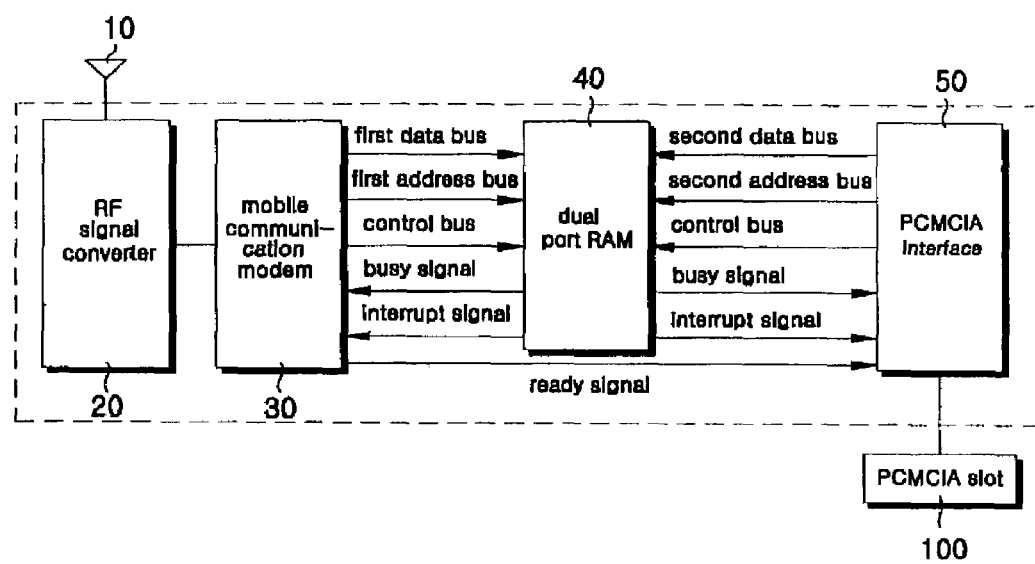
FIG. 1 is a block diagram schematically showing a card device for high-speed wireless data communication in accordance with the present invention.
Figure 2:
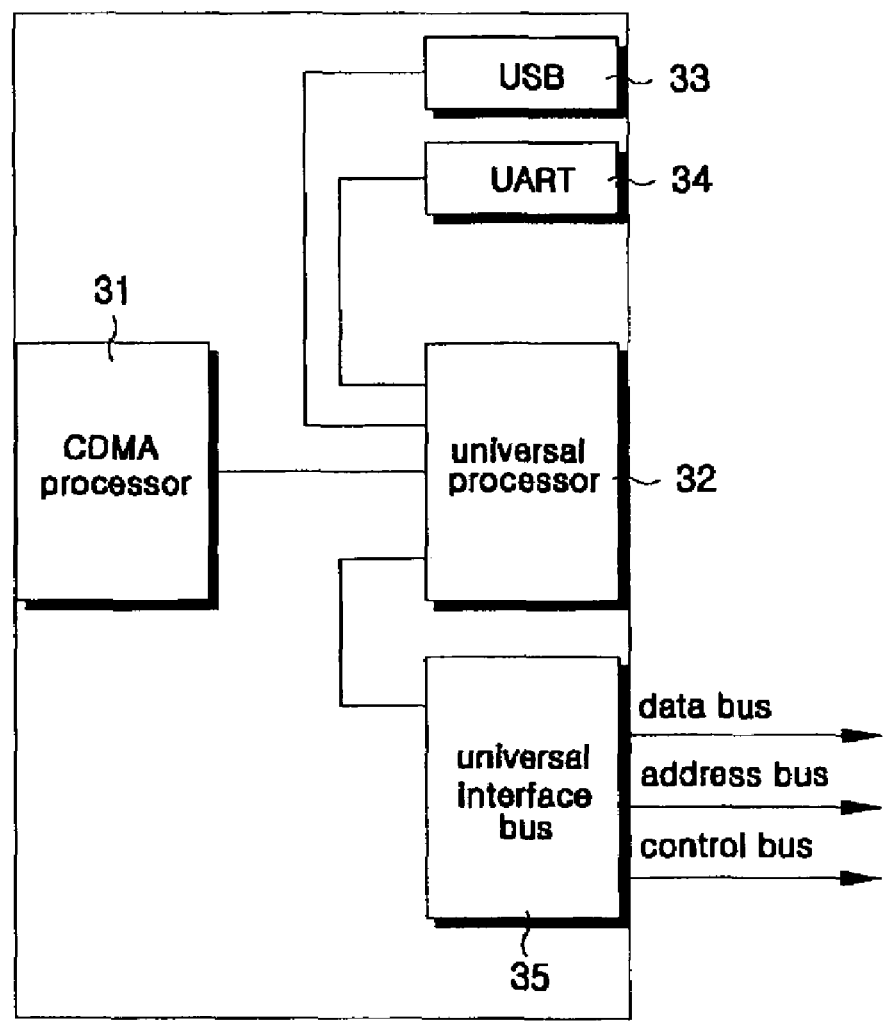
FIG. 2 is a block diagram schematically showing a mobile communication modem embodied in a high-speed wireless data communication card device in accordance with the present invention.

FIG. 1 is a block diagram showing a card device for high-speed wireless data communication in accordance with the present invention, and FIG. 2 is a block diagram schematically showing a mobile communication modem embodied in the high-speed wireless data communication card device in accordance with the present invention.

With reference to FIG. 1, the high-speed wireless data communication card device according to the present invention comprises an antenna 10, a radio frequency (RF) signal converter 20, a mobile communication modem 30, a dual port RAM 40 and a PCMCIA interface 50.

The antenna 10 receives an external RF signal transmitted thereto and transmits an internal data signal to an outside.

The RF signal converter 20 converts the RF signal received by the antenna 10 into a baseband signal and converts the internal data signal to be externally transmitted into an RF signal.

The mobile communication modem 30 enables a user in movement to perform wireless data communication with a third party.

As shown in FIG. 2, the mobile communication modem 30 transmits and receives the input/output addresses and data signals of a universal processor 32 over a universal interface bus 35, so as to enable high-speed data communication. This high-speed data communication cannot be performed via an existing UART serial interface bus.

The dual port RAM 40 accesses first and second address signals and first and second data signals inputted through two ports at the same time.

The PCMCIA interface 50 converts the formats of data to be transmitted and received into the data format of a PCMCIA bus of an external apparatus, for example, a portable computer or PDA coupled with the card device according to the invention.

A description will hereinafter be given of the operation of the high-speed wireless data communication card device with the above-stated construction in accordance with the present invention.

Figure 3:
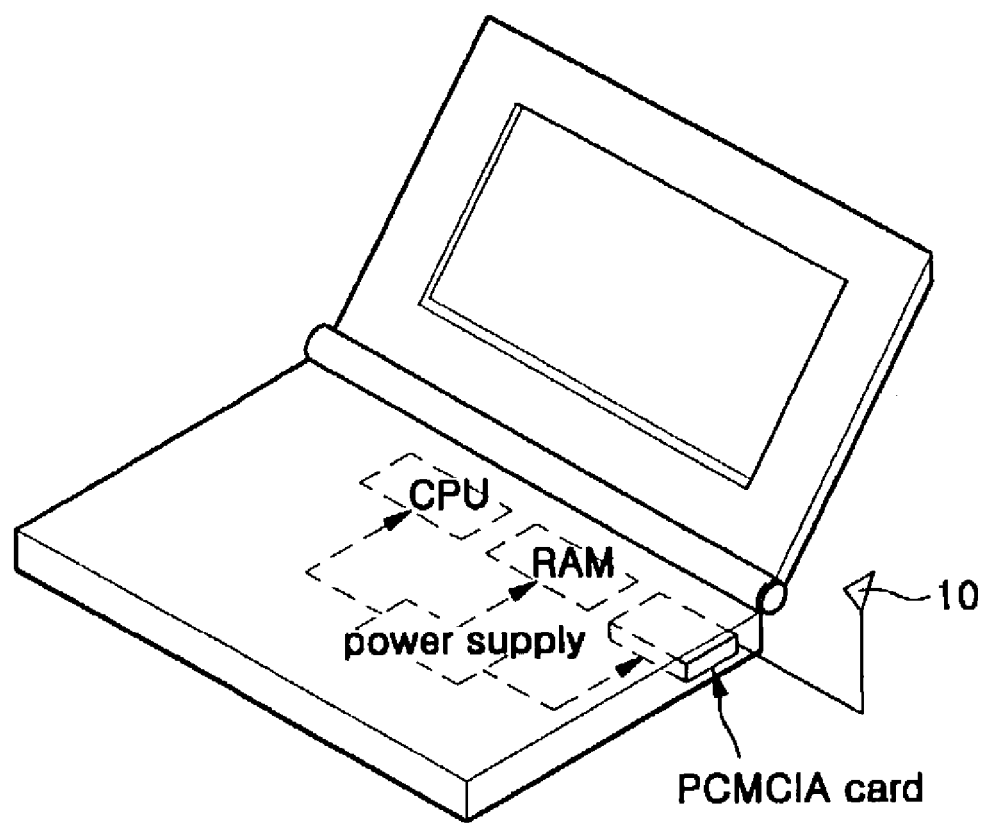
FIG. 3 is a perspective view showing a portable computer on which a high-speed wireless data communication card device is mounted, in accordance with an embodiment of the present invention.

FIG. 3 is a perspective view showing a portable computer on which a high-speed wireless data communication card device is mounted, in accordance with an embodiment of the present invention. If the high-speed wireless data communication card device is mounted into a PCMCIA slot of a portable computer or PDA as shown in FIG. 3, then a CDMA processor of the card device is driven.

Thereafter, the high-speed wireless data communication card device and the portable computer equipped with the card device perform their respective initialization operations for driving their respective device drivers to conduct data communication. These initialization operations are well known to those skilled in the art and a description thereof will thus be omitted.

Once the high-speed wireless data communication card device is initialized after being mounted to the portable computer, a user begins to conduct wireless data communication through a variety of application programs.

At this time, when the PCMCIA interface accesses the same address of the dual port RAM 40 being accessed by the mobile communication modem 30, the dual port RAM 40 outputs an interrupt signal to the PCMCIA interface.

Alternatively, at the time that the mobile communication modem 30 accesses the same address of the dual port RAM 40 being accessed by the PCMCIA interface 50, the dual port RAM 40 outputs an interrupt signal to the mobile communication modem 30.

In this manner, the mobile communication modem and a central processing unit of the mobile communication terminal equipped with the card device can prevent a collision from occurring during data communication.

Therefore, the high-speed wireless data communication card device according to the present invention can perform wireless data communication much more rapidly and stably than that via an existing USB interface and UART serial bus interface.

As apparent from the above description, the present invention provides a card device for high-speed wireless data communication wherein a mobile communication modem with a high-speed CDMA processor is connected in parallel with a dual port RAM to transmit and receive address and data signals to/from the dual port RAM via a universal interface bus. According to the present invention, the high-speed wireless data communication card device is able to perform wireless data communication faster and more stable than that via an existing USB interface and UART serial bus interface.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A card device for high-speed wireless data communication, comprising:
    an antenna for transmitting and receiving a radio frequency (RF) signal;
    a RF signal converter for converting the RF signal received by said antenna into a baseband signal and converting an internal data signal into a RF signal;
    a mobile communication modem for outputting the internal data signal to said RF signal converter, receiving the baseband signal from said RF signal converter, checking whether a dual port random access memory (RAM) is accessible, and performing a data transmission/receiving operation with said dual port RAM when said dual port RAM is accessible;
    said dual port RAM having two ports respectively connected to said mobile communication modem and a PCMCIA (Personal Computer Memory Card International Association) interface, said dual port RAM interfacing a data transmission/receiving operation between said mobile communication modem and said PCMCIA interface and outputting an interrupt signal to said PCMCIA interface when an address being accessed by said mobile communication modem is accessed by said PCMCIA interface; and
    said PCMCIA interface being connected to an external apparatus according to a PCMCIA protocol, said PCMCIA interface checking whether said dual port RAM is accessible, and performing a data transmission/receiving operation with said dual port RAM when said dual port RAM is accessible;
    wherein said PCMCIA interface transmits address signals to said dual port RAM and checks whether said dual port RAM is accessible based on said dual port RAM outputting the interrupt signal.

2. The card device as set forth in claim 1, wherein said PCMCIA interface transmits and receives address and data signals to/from said dual port RAM.

3. The card device as set forth in claim 1, wherein said external apparatus comprises a personal computer.

4. The card device as set forth in claim 1, wherein said mobile communication modem comprises a high-speed CDMA (code division multiple access) processor connected in parallel with said dual port RAM to transmit and receive address and data signals to/from the dual port RAM.

5. A card device for high-speed wireless data communication, comprising:
    an antenna for transmitting and receiving a radio frequency (RF) signal;
    a RF signal converter for converting the RF signal received by said antenna into a baseband signal and converting an internal data signal into a RF signal;
    a mobile communication modem for outputting the internal data signal to said RF signal converter, receiving the baseband signal from said RF signal converter, checking whether a dual port random access memory (RAM) is accessible, and performing a data transmission/receiving operation with said dual port RAM when said dual port RAM is accessible;
    said dual port RAM having two ports respectively connected to said mobile communication modem and a PCMCIA (Personal Computer Memory Card International Association) interface, said dual port RAM interfacing a data transmission/receiving operation between said mobile communication modem and said PCMCIA interface and outputting an interrupt signal to said mobile communication modem when an address signal being accessed by said PCMCIA interface is accessed by said mobile communication modem;
    said PCMCIA interface being connected to an external apparatus according to a PCMCIA protocol, said PCMCIA interface checking whether said dual port RAM is accessible, and performing a data transmission/receiving operation with said dual port RAM when said dual port RAM is accessible;
    wherein said mobile communication modem transmits address signals to said dual port RAM and checks whether said dual port RAM is accessible based on said dual port RAM outputting the interrupt signal.

6. The card device as set forth in claim 5, wherein said mobile communication modem transmits and receives address and data signals to/from said dual port RAM over a universal interface bus.

7. The card device as set forth in claim 5, wherein said external apparatus comprises a personal computer.

8. The card device as set forth in claim 5, wherein said mobile communication modem comprises a high-speed CDMA (code division multiple access) processor connected in parallel with said dual port RAM to transmit and receive address and data signals to/from the dual port RAM.

* * * * *